(12) United States Patent
Soares

(10) Patent No.: US 6,293,305 B1
(45) Date of Patent: Sep. 25, 2001

(54) FLUID FLOW DISTRIBUTOR

(75) Inventor: Jairo Luiz Soares, Sao Paulo (BR)

(73) Assignee: Spirax Sarco Industria e Comercio Ltda., Cotia (BR)

( * ) Notice: Subject to any disclaimer, the term of this patent is extended or adjusted under 35 U.S.C. 154(b) by 0 days.

(21) Appl. No.: 09/367,388

(22) PCT Filed: Feb. 12, 1998

(86) PCT No.: PCT/BR98/00008

§ 371 Date: Oct. 25, 1999

§ 102(e) Date: Oct. 25, 1999

(87) PCT Pub. No.: WO98/36210

PCT Pub. Date: Aug. 20, 1998

(30) Foreign Application Priority Data

Feb. 14, 1997 (BR) .................................. 9700242

(51) Int. Cl.[7] ................................................ E03B 11/00
(52) U.S. Cl. .................................... 137/597; 137/884
(58) Field of Search .................................. 137/597, 884

(56) References Cited

U.S. PATENT DOCUMENTS

| 3,351,281 | 11/1967 | Keil | 236/56 |
| 5,546,976 * | 8/1996 | Farquhar | 137/183 |
| 5,881,766 * | 3/1999 | Schlesch et al. | 137/597 |

FOREIGN PATENT DOCUMENTS

| 2 654 189 | 5/1991 | (FR) . |
| 2 670 270 | 6/1992 | (FR) . |
| 2 251 286 | 1/1992 | (GB) . |
| 2 251 054 | 6/1992 | (GB) . |

* cited by examiner

Primary Examiner—A. Michael Chambers
Assistant Examiner—Thomas L. McShane
(74) Attorney, Agent, or Firm—Duane Morris & Heckscher LLP

(57) ABSTRACT

A fluid flow distributor, to be used with a steam trap, has a single valve body which includes a steam inlet operatively connected to a steam feeding pipe, a steam outlet operatively connected to the steam trap inlet and in selective fluid communication with the steam inlet through a first valve element provided in this fluid communication, and which selectively allows and blocks said fluid communication, a condensate inlet operatively connected to the steam trap outlet, and a condensate outlet which is open to the outside of the single valve body and provided with fluid communication with the condensate inlet thereof.

5 Claims, 2 Drawing Sheets

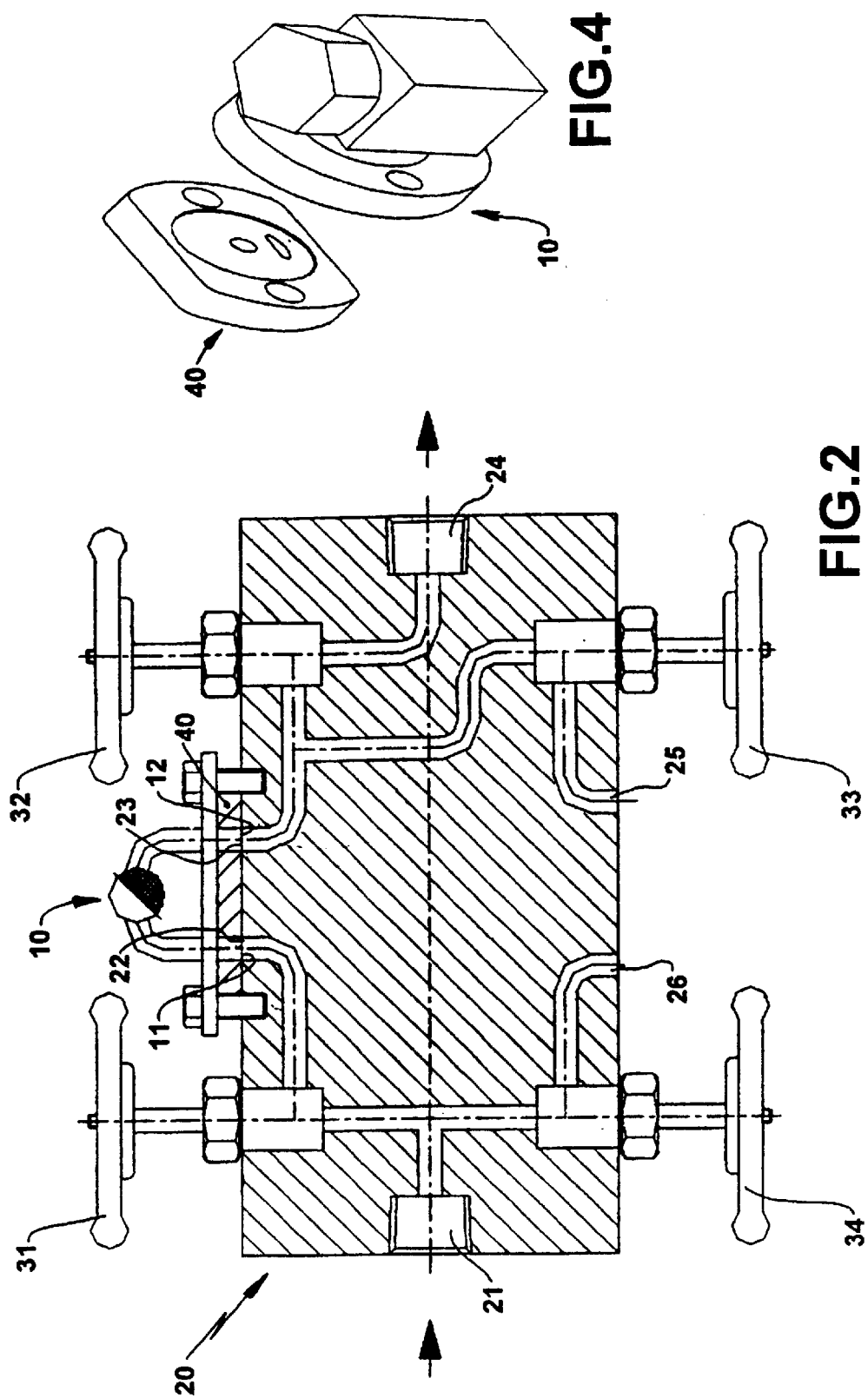

FLUID FLOW DISTRIBUTOR

FIELD OF THE INVENTION

The present invention refers to a fluid flow distributor to be used with a steam trap of the type used in fluid feeding pipes, particularly those for steam feeding.

BACKGROUND OF THE INVENTION

The piping plants generally use many valves and devices for blocking, draining or directing fluid flow, as well as accessories for interconnecting these elements, which may present leak points. The steam feeding pipes are provided with steam traps which operate for removing the condensate from the main steam line of the plant, carrying this condensate to the environment or to condensate return lines of said plant.

In the known constructions of steam piping plants, the mounting of steam traps to the main steam line connecting the latter to the condensate return line or to the atmosphere, requires a large amount of components and consequently of replacement parts in the installations, as well as special mounting tools which, besides making difficult the installation and maintenance tasks, results in a high cost for installing and operating said plants. These difficulties of installation, maintenance and operation increase when the work must be carried out in places of difficult access in the main line. Furthermore, due to the complexity of the conventional installations, it is not always possible to place the steam traps in their best working position, jeopardizing the performance thereof.

Disclosure of the Invention

It is therefore an object of the present invention to provide a fluid flow distributor, particularly for mounting a steam trap in a steam feeding pipe plant which, besides making easier the installation, maintenance and operation tasks in said plant, reduces the number of components used in the installation of said steam traps in a plant, thereby reducing the costs with equipment, and with the installation, maintenance and operation thereof.

Another object of the present invention is to provide a steam piping plant with a fluid flow distributor which presents the above mentioned advantages and which further allows an installation of steam traps in the main line of the steam piping plant with an optimized positioning of the steam trap, even in places of difficult access. An additional object of the present solution is to provide a fluid flow distributor which, besides the advantages above, allows the standardization of installations with less and simplified tools and facilitates the access and replacement of the steam traps of said plant.

These and others objectives are achieved through a fluid flow distributor to be used with a steam trap, comprising a single valve body which includes: a steam inlet, operatively connected to a steam feeding pipe; a steam outlet, operatively connected to the steam trap inlet and in selective fluid communication with the steam inlet; a condensate inlet, operatively connected to the steam trap outlet; a condensate outlet, which is open to the outside of the single valve body and which is provided with fluid communication with the condensate inlet thereof; and a first valve element, provided in the fluid communication between the steam inlet and the steam outlet of the single valve body, in order to selectively allow and block the fluid communication between the steam feeding pipe and the steam trap. This construction allows a standardization of installation, because the whole connection of the trap with the plant is carried out through the single valve body.

BRIEF DESCRIPTION OF THE DRAWINGS

The invention will be described below, based on the attached drawings, in which:

FIG. 2 represents, schematically and in a longitudinal section, a fluid flow distributor construction, according to the present invention;

FIG. 4 represents, schematically and in a perspective view, a steam trap and an element for connecting it to the fluid flow distributor of the present invention;

BEST MODE OF CARRYING OUT THE INVENTION

Figure 1:
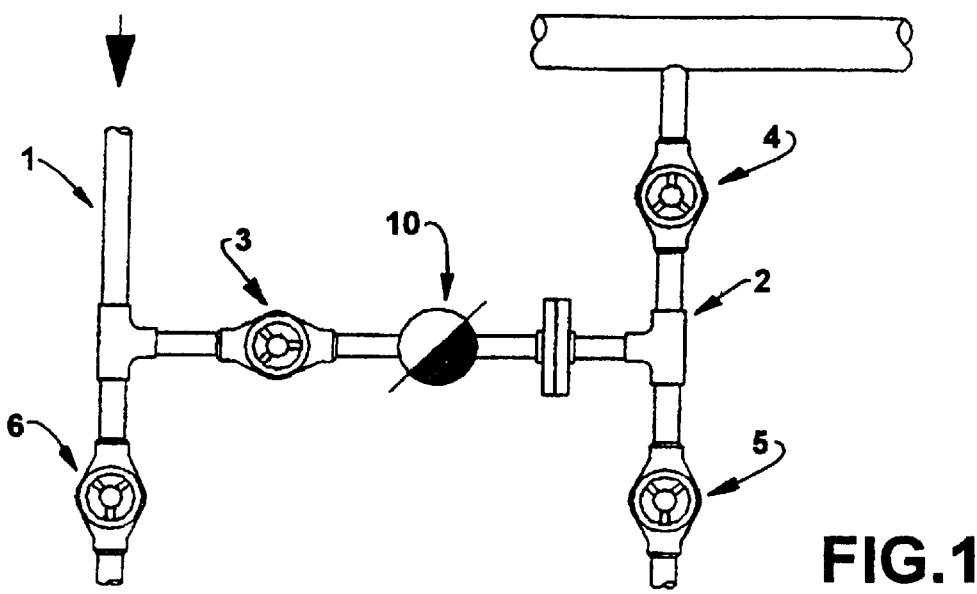
FIG. 1 represents, schematically and partially, the installation of a steam trap in a steam plant provided with a steam feeding line and a condensate return line, according to the prior art.

The fluid flow distributor of the present invention will be described according to the attached drawings for a steam plant having a steam feeding pipe 1, to which is coupled at least one steam trap 10 which transfers the condensate present in said steam feeding pipe to the environment or also to a condensate return pipe 2, each steam trap 10 being connected to the steam feeding pipe 1 and to the condensate return pipe 2 through appropriate connecting elements, according to the prior art. In the steam plant construction provided with steam raps of the prior art (FIG. 1), between the steam feeding pipe 1 and the condensate return pipe 2 is mounted, through appropriate connecting elements, at least one steam trap 10 having an inlet 11 and an outlet 12, operatively and respectively connected to the steam feeding pipe 1 and to the condensate return pipe 2, through appropriate connections.

According to the illustrations, the mounting of each steam trap 10 to the steam feeding pipe 1 and to the condensate return pipe 2 is made through the provision of valve elements downstream and upstream of each steam trap, said valve members selectively allowing and blocking the fluid communication between the steam feeding pipe 1 and the condensate return pipe 2.

In the construction illustrated in FIG. 1, a first valve 3, which is normally open, is provided upstream the steam trap 10, in the fluid communication between the steam feeding pipe 1 and said steam trap 10, in order to selectively allow and block said fluid communication. In this construction, downstream the steam trap 10, in the condensate return pipe 2, are provided second and third valves 4, 5, said second valve 4 being normally open, in order to allow the selective fluid communication between the steam trap 10 and the condensate return pipe 2, while the third valve 5 is in its normally closed state.

In this embodiment, the closed condition of the second valve 4 and the open condition of the third valve 5 is selectively obtained for draining the team trap 10 or for checking the operation of the latter, e.g. by discharging to the atmosphere. according to the illustrations, the steam plant is further provided in its steam feeding pipe 1 with a fourth valve 6, which is normally closed and which selectively allows and blocks the fluid communication between the steam feeding pipe 1 and the outside environment, for cleaning and/or draining said pipe.

This construction presents the previously discussed drawbacks.

According to the present invention, the connection of each steam trap 10 to the steam feeding pipe 1 is made through a fluid flow distributor, which comprises a single valve body 20, which is prismatic, for example, and to which is mounted a steam trap 10 through a sealing connection and screws, said single valve body 20 having a steam inlet 21, which is operatively connected to the steam feeding pipe 1, and a steam outlet 22, which is operatively connected to the inlet 11 of the steam trap 10 and in selective fluid communication with said steam inlet 21.

The single valve body 20 is further provided with a condensate inlet 23, which is operatively connected to the outlet 12 of the steam trap 10, and a condensate outlet 25, which is open to the outside of the single valve body 20 and provided with fluid communication with the condensate inlet 23 thereof. In the illustrated construction, the condensate outlet 24 is connectable to the condensate return pipe 2.

According to the invention, a first valve element 31, which is normally open and provided at the fluid communication between the steam inlet 21 and he steam outlet 22 of the single valve body 20, selectively allows the fluid communication between the steam feeding pipe 1 and the steam trap 10, during a normal operation condition of said steam trap 10 and allowing the blocking of this fluid communication in an inoperative condition of said steam trap 10, such as for removing it from the distributor being described.

Figure 3:
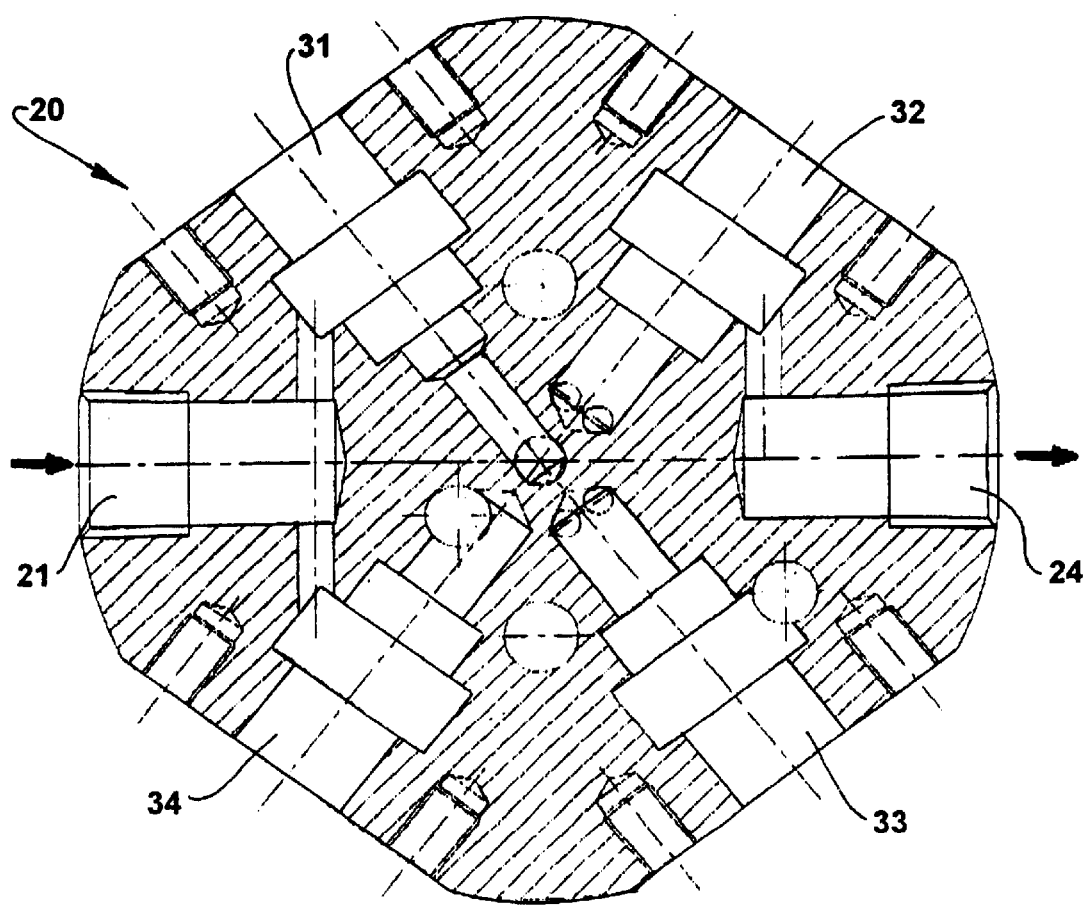
FIG. 3 represents, schematically and in a longitudinal section, another arrangement for the valve elements of the fluid flow distributor, according to the present invention.

According to the illustrations in FIGS. 2 to 4, the single valve body 20 of the fluid flow distributor of the present invention is further provided with a second valve element 32, which is normally opened and provided in the fluid communication between the condensate inlet 23 and the condensate outlet 24 of the single valve body 20, in order to selectively allow the fluid communication between the steam trap 10 and the condensate return pipe 2, during the normal operation condition of the steam trap 10, interrupting said fluid communication, for example during an inoperative condition of the steam trap 10, such as for removing it from the distributor being described, or for checking the operation of said steam trap 10.

In the illustrated construction, the single valve body 20 further presents a third valve element 33, which is normally closed and provided in the fluid communication between the condensate inlet 23, and a condensate drain outlet 25, which is open to the outside of the single valve body 20, in order to allow said fluid communication in the situations in which the second valve element 32 is blocking the fluid communication between the condensate inlet 23 and the condensate outlet 24 of the single valve body 20, the steam trap 10 being in its operative condition, and in order to block said communication during the normal operation of said steam trap 10. In the illustrated construction, the single valve body 20 further presents a cleaning and/or draining outlet 26, which is open to the outside of said single valve body 20 and in selective fluid communication with the steam inlet 21 thereof. In a constructive option, the fluid communication between the steam feeding pipe 1 and the cleaning outlet 26 is selectively allowed by a fourth valve element 34, which is normally closed and provided at the fluid communication between the steam inlet 21 and the cleaning outlet 26 of the single valve body 20.

According to the illustrations, all the valve elements are the same and of the type which is manually and independently operated from the outside of the single valve body 20 and the steam trap 10 being mounted to single valve body 20 through a connecting sealing element 40. However, other constructions are possible within the concept described, using for example one, two or three valve elements, which may optionally be similar, with the number of valve elements being defined in function of inlets and outlets provided at the single valve body and the amount of inlets and outlets to be controlled by the valve elements. In another construction, not illustrated, a single valve element allows and blocks the selective fluid communication between the steam inlet 21 and the steam outlet of the single valve body 20 and the cleaning outlet 26; and another valve element allows and blocks the selective fluid communication between the condensate inlet 23 and the condensate outlet 24 and the condensate drain 25 of the single valve body 20, in a construction in which all of said inlets and outlets are provided at the single valve body.

FIG. 3 illustrates a shape variation for the single valve body 20, in which the valve elements 31, 32, 33 and 34, the steam inlet 21 an the condensate outlet 24 are radially placed on a same plane, the condensate drain outlet 25 and the cleaning outlet 26 being axially located, making possible the internal machining of the single valve body 20.

What is claimed is:

1. A fluid flow distributor, to be used with a steam trap, comprising a single valve body provided with:
   a steam inlet operatively connected to a steam feeding pipe;
   a steam outlet operatively connected to the steam trap inlet and in selective fluid communication with the steam inlet;
   a condensate inlet operatively connected to the steam trap outlet;
   a condensate outlet which is open to an outside of the single valve body and which is provided with fluid communication with the condensate inlet thereof; and
   a first valve element provided in the fluid communication between the steam inlet and the steam outlet of the single valve body, in order to selectively allow and block the fluid communication between the steam feeding pipe and the steam trap;
   a second valve element provided in the fluid communication between the condensate inlet and a condensate outlet, in order to selectively allow and block said fluid communication;
   a third valve element provided in the fluid communication between the condensate inlet and the condensate drain outlet, in order to selectively allow and block said fluid communication; and
   a fourth valve element provided in the fluid communication between the steam inlet and a cleaning outlet, selectively allowing and blocking said fluid communication, wherein said first, second, third and fourth valve elements are radially placed on a same plane on the single valve body.

2. The fluid flow distributor according to claim 1, wherein the condensate outlet of the single valve body is connectable to a condensate return pipe.

3. The fluid flow distributor according to claim 2, wherein the condensate drain outlet provided on the single valve body is open to the outside of the single valve body and is in selective fluid communication with the condensate inlet thereof.

4. The fluid flow distributor according to claim 3, wherein the cleaning outlet provided on the single valve body is open to the outside and is in selective fluid communication with the steam inlet of said single valve body.

5. The fluid flow distributor according to claim 4, wherein the steam trap is mounted to the single valve body through a connecting sealing element.

\* \* \* \* \*